United States Patent [19]

Long

[11] Patent Number: 5,456,438
[45] Date of Patent: Oct. 10, 1995

[54] MACHINE TOOL SUPPORT

[75] Inventor: Michael Long, Rochester, N.Y.

[73] Assignee: Eastman Kodak Company, Rochester, N.Y.

[21] Appl. No.: 98,383

[22] PCT Filed: Dec. 3, 1992

[86] PCT No.: PCT/EP92/02800

§ 371 Date: Aug. 9, 1993

§ 102(e) Date: Aug. 9, 1993

[87] PCT Pub. No.: WO93/12371

PCT Pub. Date: Jun. 24, 1993

[30] Foreign Application Priority Data

Dec. 10, 1991 [FR] France ................... 91 15561

[51] Int. Cl.⁶ ................................................ F16M 13/00
[52] U.S. Cl. ...................... 248/362; 248/638; 248/561
[58] Field of Search ................................. 248/561, 638, 248/636, 633, 616, 603, 658, 562, 362, 363, 560

[56] References Cited

U.S. PATENT DOCUMENTS

| | | | |
|---|---|---|---|
| 977,330 | 11/1910 | Von Rügen | 248/362 X |
| 3,158,381 | 11/1964 | Yamamura | 248/362 X |
| 5,149,045 | 9/1992 | Szarka | 248/362 X |

FOREIGN PATENT DOCUMENTS

| | | | |
|---|---|---|---|
| 792149 | 8/1968 | Canada | 248/362 |
| 2137319 | 12/1972 | France . | |
| 2207845 | 6/1974 | France . | |
| 2361599 | 3/1978 | France | 248/363 |
| 673829 | 4/1990 | Switzerland . | |
| 1081915 | 9/1967 | United Kingdom . | |
| 2030265 | 4/1980 | United Kingdom . | |

Primary Examiner—Karen J. Chotkowski
Attorney, Agent, or Firm—Charles E. Snee, III

[57] ABSTRACT

The invention relates to a machine tool support including a fixed frame (10), a source (16, 17), a source of suction (16, 17) of compressed air, a bearing structure (13); comprising a plate (11) provided with holes (14); and pad (12); intended to absorb the vibration generated by the operation of the machine and/or by its environment. According to the present invention the holes (14) can communicate selectively with the source of suction or the source of compressed air. In addition, the machine rests directly on the surface of the plate (11), a pad (12) suitable for absorbing the vibration being disposed between the frame and the bearing structure.

17 Claims, 3 Drawing Sheets

MACHINE TOOL SUPPORT

FIELD OF THE INVENTION

The invention relates to a machine tool support particularly suited to machines which are sensitive to the vibration generated by their operation or their environment.

BACKGROUND OF THE INVENTION

It is known that, in workshops, machine tools are fixed to the floor by suitable means such as bolts, clamps or otherwise. These arrangements, although satisfactory from the point of view of the fixing in itself, have the major disadvantage of having no effect in reducing the vibration inherent in the operation of the machines. This vibration is transmitted to the surrounding range of machine tools. This causes maladjustment of the other machines and their components.

Moreover, such fixings by bolts or clamps prove unsuitable when the need arises to replace a machine in the minimum of time, in particular because of the inaccessibility of one or more of these fixing elements. In addition, in the case of machines whose weight is relatively great, it is often difficult to position each of the bolts rapidly in the corresponding holes in the support.

According to the device described in published French patent application 2 361 599 and shown in FIG. 1, the bearing parts 1 of the machine to be fixed are placed on a bearing face 2. The bearing face 2 has a plurality of recesses 3 connected to a suction device and provided with an airtight covering 4. The bearing parts of the machine are placed on the bearing face 2 through airtight seals 5 placed around the recesses. The seals 5 are partially embedded in the housings so that the airtight bearing always takes place on these seals. These seals can, by way of example, consist of an elastomer material. These seals, in addition to providing the vacuum-tight function, absorb the vibration due to the operation of the machine 7. As is well known in the art, the characteristics of the seals are adapted according to the weight of the machine. Such a device, although satisfactory from the point of view of the fixing to the floor under the effect of the negative pressure applied in the recesses, has a certain number of disadvantages:

the recesses described in this document are, because of their shape, difficult and expensive to produce;

the suction exerted on the bearing surfaces of the machine is limited to the surfaces defined by the airtight seals, which, for relatively light machines, may prove insufficient;

the positioning of the machine on the seals is not without problems since, particularly in the case of heavy machines, it is often necessary, in order to position the machine precisely, to slide it over the bearing face. There is a risk that such a movement may damage or displace the seals;

finally, as mentioned in the document, the characteristics of the seal, in particular the dimensional characteristics, are calculated according to the load resulting from the weight of the machine, the manufacturers of the elastomer materials making up the seals in fact providing graphs making it possible to calculate accurately, for a given thickness of elastomer material, the area of material required for absorbing the vibration to the greatest possible extent. According to the device described in the patent, the carrying surface is formed by the surface of all the seals distributed over the bearing face 2. Such an arrangement makes it difficult to adapt the carrying surface according to the weight of the machine, particularly when the machine is changed for another one whose weight is not necessarily identical. This involves in particular the replacement of at least some of the seals, and the gain in carrying surface may be limited by the space existing between adjacent seals on the bearing face.

Published British patent specification No. 1 081 915 describes a combustion engine support comprising a bearing structure positioned on a frame and on which is located a combustion engine, means located between the bearing structure and the frame being provided for absorbing the vibration generated by the operation of the engine. Nowhere in this specification is it suggested to use means for facilitating the positioning of the engine on the bearing structure as well as its holding.

Published French patent application No. 2 207 845 describes a process and a device for moving an apparatus on a fixed frame. No means are disclosed for absorbing the vibration generated by the apparatus during its operation. Furthermore, the apparatus has to be first positioned on a bearing structure, and then, the bearing structure which is mounted on the frame can be easily moved on the frame by means of an air cushion created between the bearing structure and the frame. The problem is that no means are provided for easily positioning the apparatus on the bearing structure which is an important drawback for heavy apparatus.

Swiss patent No. 673 829 describes a process for moving a load on a frame. As in the just mentioned French Application nothing is disclosed for solving the problem of absorbing the vibration, the resilient means (15, FIG. 2) being provided for compensating the surface irregularities of the parts in contact with the bearing structure and the frame so that the bearing force created by air pressure is equally distributed over the whole contact surface between the two elements. In fact, the problem of the vibration had not to be addressed with such an apparatus since its main object is to move a "passive" load which does not generate any vibration. Furthermore nothing is disclosed to immobilize the load on the frame. At least, the load needs to be first totally positioned on the bearing structure without any facilitating means, before benefiting from the facilitating means, provided for moving the bearing structure on the frame.

SUMMARY OF THE INVENTION

Thus the problem which the present invention proposes to resolve is to produce a machine tool support absorbing, in a satisfactory manner, the vibration generated by the operation of the machine or by its environment whilst allowing an easy positioning of the machine on the support.

Another aim of the present invention is to provide a machine tool support which can be adapted simply and inexpensively to change from one machine to another.

Other aims Of the present invention will become apparent during the following detailed description.

The aims of the present invention are achieved by means of a machine tool support comprising:

a fixed frame (10);

a bearing structure (13) positioned on the fixed frame (10) and provided for receiving a machine (20), the bearing structure comprising a plurality of holes over substantially the whole of its surface;

means for selectively connecting the holes to a pressure source or a vacuum source (17); characterized in that it comprises means (12) provided for absorbing the vibration generated by the operation of the machine or by its environment, the holes (14) provided in said bearing structure (13) opening into the surface of the bearing (13) directly in contact with the bearing face or parts of the machine so that means (12) for absorbing the vibration can be positioned between the fixed frame (10) and the bearing structure (13).

According to a variant of the support according to the invention, the bearing structure (13) is covered with a layer of material increasing the coefficient of friction of the surface of the bearing structure in contact with the machine.

According to yet another variant, means suitable for allowing the positioning of the machine against two perpendicular reference surfaces are disposed on the frame of the machine. Advantageously, the positioning means comprise members having two surfaces defining substantially an L and disposed facing at least two opposite corners of the said bearing structure, at least one of these members being fixed, at least one other having one of its two surfaces movable with respect to the other so as to be able to occupy two successive positions, a "retracted" position allowing the installation or removal of the machine and an "advanced" position preventing any movement of the machine in the plane of the bearing structure.

Advantageously again, the movable surface moves along an axis whose angle, with respect to the other surface forming the corresponding positioning member, is slightly less than 90°. The angle preferably varies between 55° and 89.9°.

BRIEF DESCRIPTION OF THE DRAWINGS

In the following detailed description reference will be made to the drawing, in which.

DETAILED DESCRIPTION OF THE INVENTION

Figure 2:
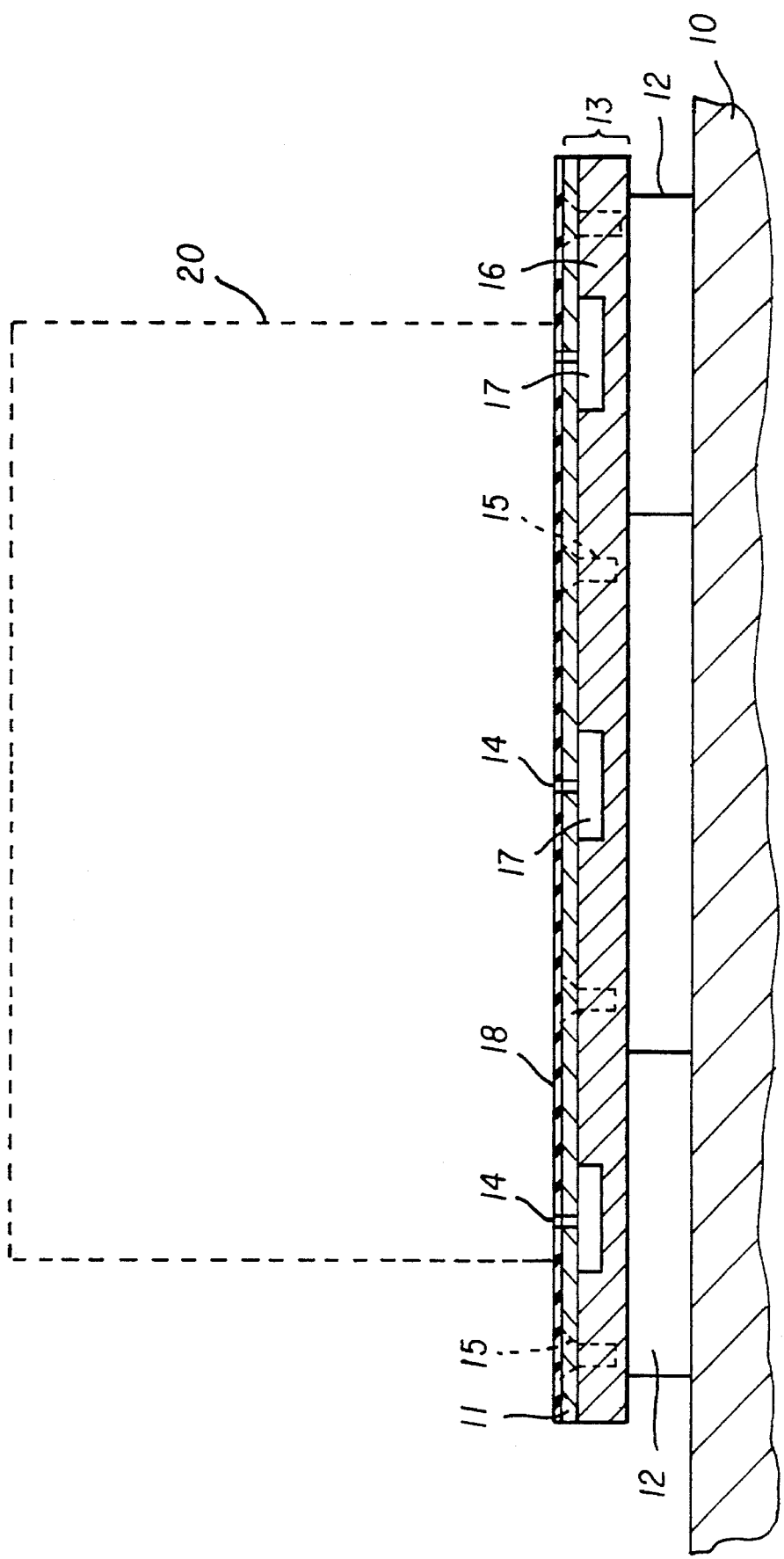
FIG. 2 shows a view in cross section of the machine tool support according to the present invention.

FIG. 2, to which reference is now made, shows a view in cross section of the machine support according to the present invention. It consists principally of a frame 10 which, preferably, is fixed to the floor by appropriate means (sealing, bolts, clamps or other equivalent means).

It also includes a support structure 13 positioned on the fixed frame 10, through means 12 suitable for absorbing the vibration generated by the operation of the machine or by its environment and which will be dealt with in more detail below. As shown in FIG. 2, the support structure comprises a plate 11 and a chamber 16 which will also be described in more detail subsequently. The plate has holes 14 passing through it over its entire thickness and distributed over substantially all its surface, the number of holes depending in particular on the weight of the machine disposed on the support. By way of example, for a plate of 28×26 cm three rows of holes are provided distributed uniformly along one of the dimensions of the plate, holes which may be, in each of the rows, approximately 10 mm apart. The diameter of the holes is, according to one embodiment, approximately 0.9 mm. Advantageously, on the surface of the plate, which, by way of example, is made from steel, a layer (18) of a material such as rubber is bonded in order to increase the coefficient of friction of the plate and thus to improve the holding of the machine on the plate. Good results have been obtained with a 3 mm thick layer of rubber. The layer also has holes coinciding with the holes in the steel plate but whose diameter is preferably greater than that of the holes provided in the plate. According to one particular embodiment, the diameter of the holes is approximately 4 mm. In order to increase further the roughness of the layer of rubber, grooves are provided on the layer, distributed over the entire surface of the layer and preferably passing through the holes in the layer. Good results have been obtained with grooves 1.5 mm deep, 2 mm wide and arranged every 10 mm.

Using bolts 15, the plate 11 is then attached to a chamber 16 having pipes 17 by means of which all the holes are connected, the pipes themselves being connected to each other at either end of the chamber 16 and being able to be connected selectively to a source of compressed air or to a suction pump (these items, for the sake of more clarity, not being shown).

The chamber 16, thus fixed to the plate 11, is bonded to the fixed frame 10 by means of at least one pad 12 formed from a material suitable for absorbing the vibration generated by the operation of the machine or by its environment. Advantageously the pads 12 are made from an elastomer, such as a compressible cellular polyurethane, of the SYLOMER R type. The surface area of the pad or pads is, for a given elastomer of a given thickness, calculated precisely according to the weight of the machine. The calculations enabling these surface areas to be determined are made from graphs supplied by the manufacturers of such elastomers. Since this is not the object of the present invention, it consequently requires no further description. By way of example, a pad is disposed at each corner of the support structure 13. If it is desired to change the machine for a machine with a different weight, it suffices for example to modify the surface area or the number of the pads.

With such an arrangement, it can be seen that the bearing face or parts of the machine 20 rest directly on the surface of the plate 11.

When the machine is positioned on the support, the holes 14 are connected to a source of compressed air, thus making it possible, because of the fluid film created between the bearing face of the machine and the plate, to slide the machine easily over the support. It is then immobilized by connecting the holes to a suction pump. The negative pressure thus created between the bearing face of the machine and the support presses the machine against the support. By way of example, with such a device, for a machine of 40×40 cm, a force which may exceed 1000 kg may be applied. In order to remove the machine from the support, it suffices to connect the holes to a source of compressed air again and to slide it over the support. Such operations can thus easily be carried out with limited labour.

Figure 1:
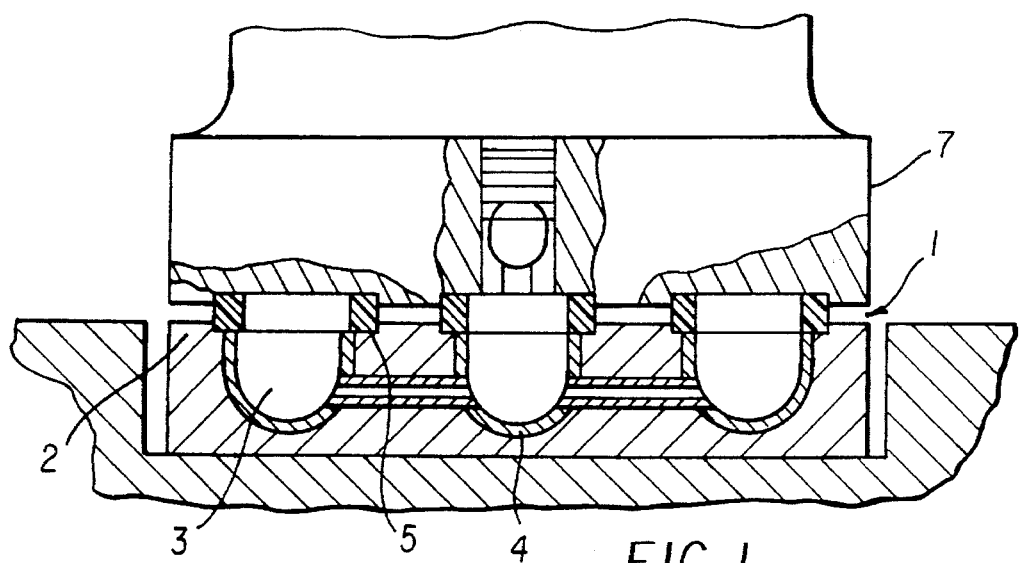
FIG. 1 shows diagrammatically a device of the type described in published French patent application No. 2 361 599.
Figure 4A:
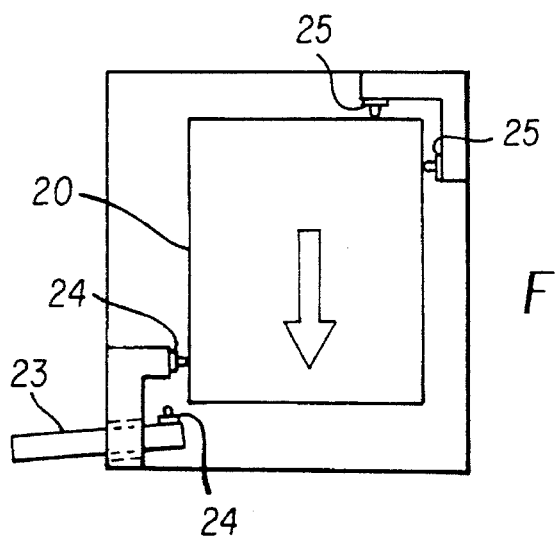
FIGS. 4A and 4B illustrate diagrammatically the functioning of the locking/unlocking means provided on the support according to the present invention.
Figure 4B:
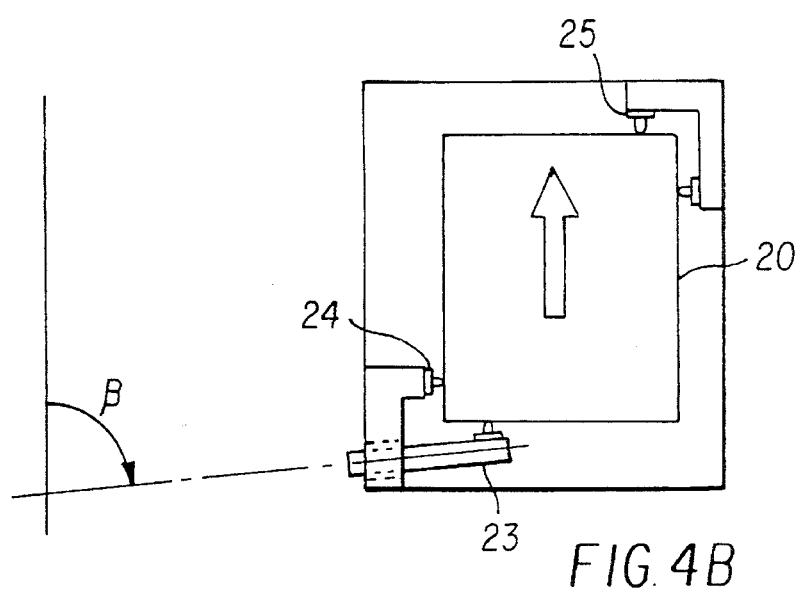
Figure 3:
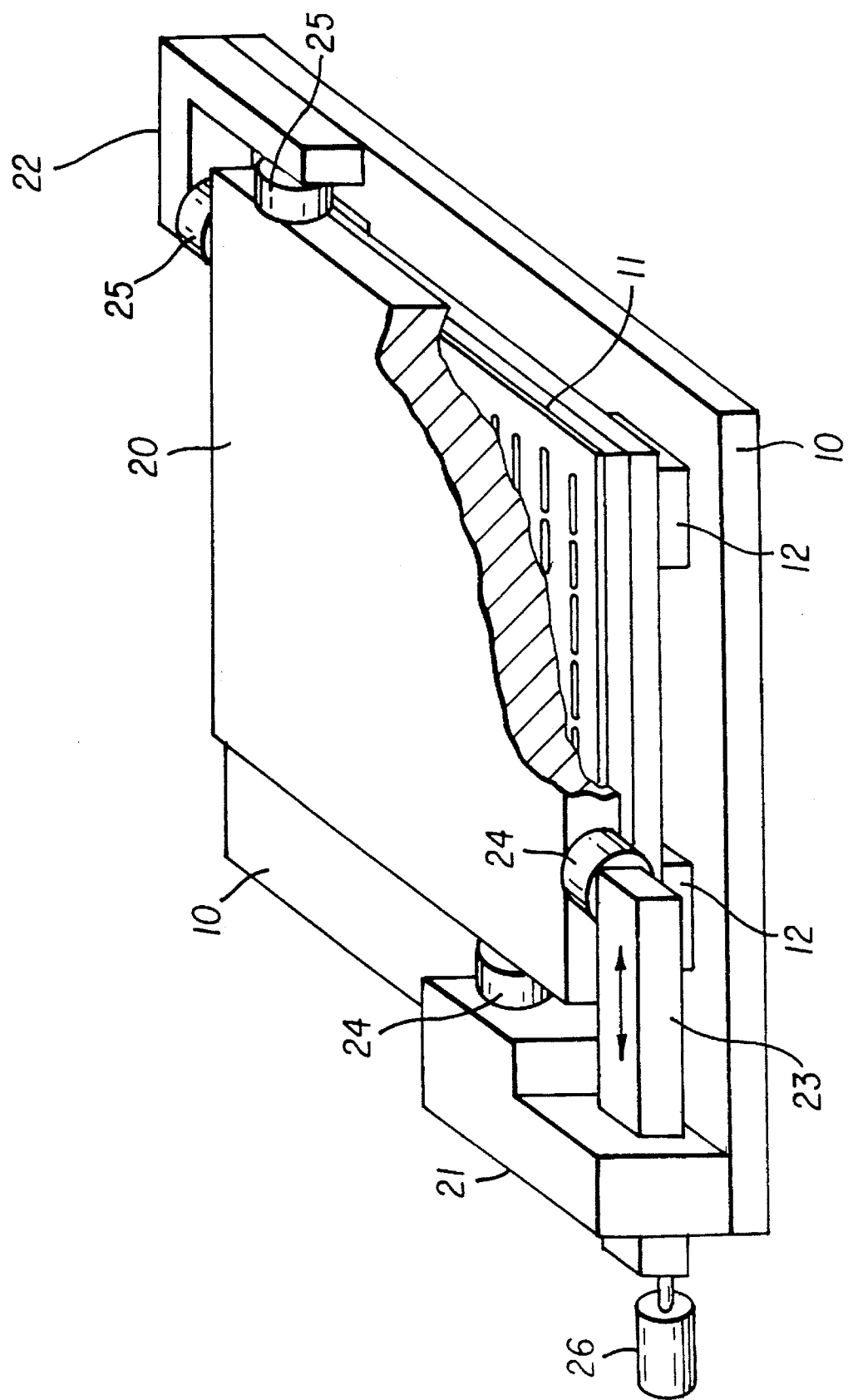
FIG. 3 shows a general perspective view, partially broken away of the machine tool support according to the present invention.

FIG. 3, to which reference is now made, is an overall representation of another embodiment of the machine tool support according to the present invention. In addition to the components already described above (bearing the same numerical references), additional means for positioning in abutment are disposed on the chassis, enabling the machine to be positioned against two substantially perpendicular reference surfaces. The additional positioning means comprise members 21, 22 having two surfaces substantially defining an L and arranged facing at least two opposite corners of the plate 11, at least one of these members 22 being fixed, at least one other forming a locking/unlocking member and having one of its two surfaces 23 movable with respect to the other so as to adopt, as shown in FIGS. 4A and 4B, two successive positions, a "retracted" position (FIG. 4A) enabling the machine to be installed or removed, and an "advanced" position locking any movement of the machine in the plane of the plate. Thus, as shown in FIGS. 4A AND 4B, the movable surface of the locking/unlocking member moves along an axis whose angle β with respect to the other surface forming the member is slightly less than 90° so as to allow a constant bearing of the machine on the additional positioning means at at least three points necessary to define the two perpendicular reference surfaces.

Advantageously, the angle varies between approximately 55° and 89.9°. For angles greater than approximately 70°, it will not be necessary to provide auxiliary means for maintaining the bearing force of the retractable surface against the corresponding surface of the machine. For smaller angles it is possible to provide control of the retractable surface by means, for example, of a pneumatic jack 26 maintaining the retractable surface bearing constantly against the machine.

As shown in FIG. 3, the internal surfaces of L shaped member 21, 22 are provided with pads 24, 25 formed from a material suitable for absorbing the vibration generated by the operation of the machine and/or by its environment. By way of example, a material of the same type as that forming the pads 12 can be used.

I claim:

1. A support for a machine tool, the machine tool having a bearing face on which the machine tool is supported, said support comprising:

a fixed frame (10);

a bearing structure (13) positioned on said fixed frame (10) for receiving a machine tool (20), said bearing structure comprising a plate ( 11 ) with a plurality of through-going holes (14) distributed over substantially the whole of its surface;

means (17) for selectively connecting said holes (14) to a pressure source or a vacuum source; and means (12) for absorbing the vibration generated by the operation of the machine tool or by its environment; wherein:

said holes (14) provided in said plate of said bearing structure (13) communicate directly with the bearing face of the machine tool and said means (12) for absorbing the vibration is positioned between the said fixed frame (10) and the said bearing structure (13).

2. Support according to claim 1, wherein said bearing structure (13) is covered with a layer (18) of a material increasing the coefficient of friction of the surface of the bearing structure in contact with the machine tool.

3. Support according to claim 2, in which the said material is rubber.

4. Support according to claim 1, wherein said means (12) enabling the vibration to be absorbed comprises at least one elastomer pad, the surface of the pad (or pads) being, for a given elastomer, determined according to the weight of the machine (20) and the thickness of the pad (or pads) (12).

5. Support according to claim 4, wherein said elastomer is a compressible cellular polyurethane.

6. Support according to claim 4, wherein a pad is disposed at each corner of said bearing structure.

7. Support according to claim 1, wherein, on said frame (10), means (21, 22) are arranged suitable for allowing the positioning of the machine (20) against two perpendicular reference surfaces.

8. A support for a machine tool, the machine tool having a bearing face on which the machine tool is supported, said support comprising:

a fixed frame (10);

a bearing structure (13) positioned on said fixed frame (10) for receiving a machine tool (20), said bearing structure comprising a plate (11) with a plurality of through-going holes (14) distributed over substantially the whole of its surface;

means (17) for selectively connecting said holes (14) to a pressure source or a vacuum source; and means (12) for absorbing the vibration generated by the operation of the machine tool or by its environment; wherein:

said holes (14) provided in said plate of said bearing structure (13) communicate directly with the bearing face of the machine tool and said means (12) for absorbing the vibration is positioned between the said fixed frame (10) and the said bearing structure (13); and on said frame (10), means (21, 22) are arranged suitable for allowing the positioning of the machine (20) against two perpendicular reference surfaces, said means (21, 22) comprising members having two surfaces substantially defining an L and disposed facing at least two opposite corners of said bearing structure (13), at least one of these members (22) being fixed, at least one other (21) having one of said two surfaces (23) movable with respect to the other so as to be able to adopt two successive positions, a retracted position enabling the machine tool (20) to be installed or removed and an advanced position preventing any movement of the machine (20) in the plane of the bearing structure.

9. Support according to claim 8, wherein said movable surface (23) moves along an axis whose angle b with respect to the other surface forming the corresponding member is slightly less than 90°.

10. Support according to claim 9, wherein said angle b varies approximately 55° and 89.9°.

11. Support according to claim 10, wherein said angle b is less than 70°, the movement of the said movable surface being controlled by an auxiliary device of the pneumatic jack type (26).

12. Support according to claim 8, wherein said surfaces of the said positioning means in contact with the said machine are provided with pads (24, 25) made from a material suitable for absorbing the vibration generated by the operation of the machine or by its environment.

13. Support according to claim 8, wherein said bearing structure (13) is covered with a layer (18) of a material increasing the coefficient of friction of the surface of the bearing structure in contact with the machine.

14. Support according to claim 13, in which the said material is rubber.

15. Support according to claim 8, wherein said means (12) enabling the vibration to be absorbed comprises at least one elastomer pad, the surface of the pad (or pads) being, for a given elastomer, determined according to the weight of the machine (20) and the thickness of the pad (or pads) (12).

16. Support according to claim 15, wherein said elastomer is a compressible cellular polyurethane.

17. Support according to claim 15, wherein a pad is disposed at each corner of said bearing structure.

* * * * *